M. D. STOCKING.
SUPPLEMENTAL WHEEL.
APPLICATION FILED APR. 2, 1909.
945,058.
Patented Jan. 4, 1910.
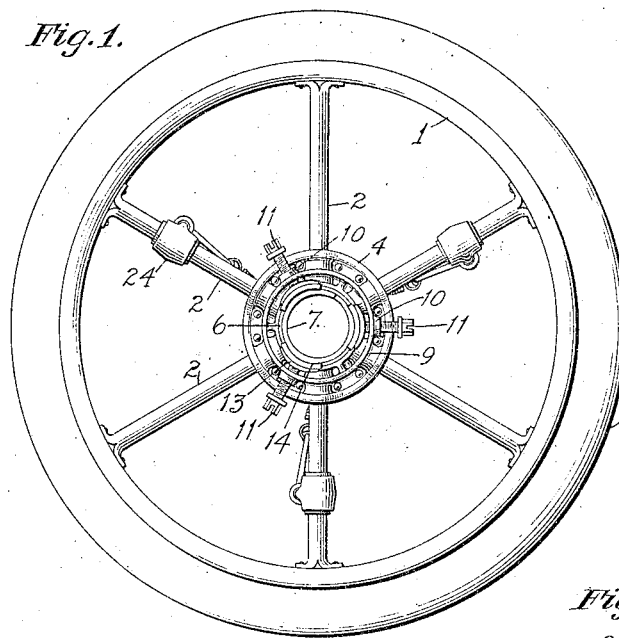
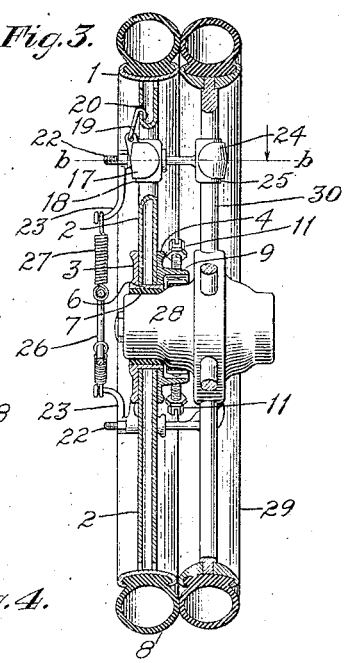
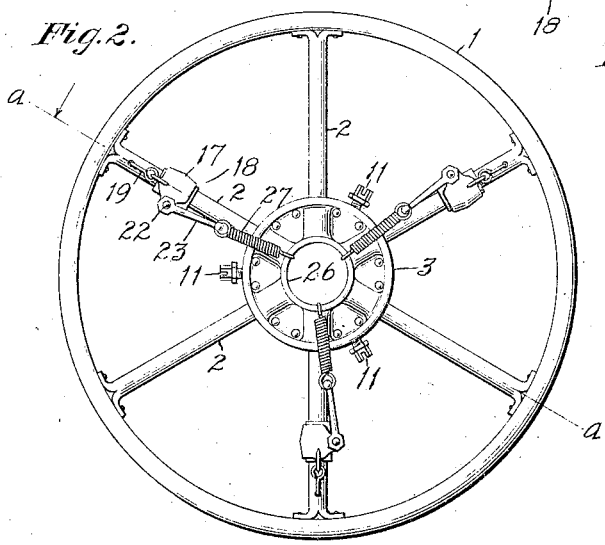
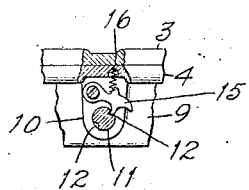
Witnesses:
E. Behel.
C. B. Clark.
Inventor:
Milton D. Stocking.
by A. O. Behel.
Attorney

UNITED STATES PATENT OFFICE.

MILTON D. STOCKING, OF LINDENWOOD, ILLINOIS.

SUPPLEMENTAL WHEEL.

945,058.     Specification of Letters Patent.     Patented Jan. 4, 1910.

Application filed April 2, 1909. Serial No. 487,581.

*To all whom it may concern:*

Be it known that I, MILTON D. STOCKING, a citizen of the United States, residing at Lindenwood, in the county of Ogle and State of Illinois, have invented certain new and useful Improvements in Supplemental Wheels, of which the following is a specification.

The object of this invention is to construct a supplemental wheel, especially for use in connection with motor vehicles, and which is of a construction which can be attached to a wheel having a disabled tire without removing the wheel.

In the accompanying drawings. Figure 1 is an inner face representation of the wheel complete. Fig. 2 is an outer face representation of the outer face of the wheel in which the tire is removed. Fig. 3 is a section on dotted line *a a* Fig. 2. Fig. 4 is a section on dotted line *b b* Fig. 3. Fig. 5 is a section through one of the adjustable shoes. Fig. 6 is a transverse section through one of the screws for an adjustable shoe showing the dog connection.

The supplemental wheel is made up of the rim 1 and a hub held in proper relation by the spokes 2. A tire 8 is placed in connection with the rim. This hub is formed of two sections 3 and 4 connected by the rivets. The section 3 has an annular flange 6 within which is located a lining 7 of leather, rubber or other yielding material. From the section 4 of the hub extends an annular flange 9 provided with three screw-threaded bosses 10, each supporting a screw 11 which is formed with two lengthwise extending slots 12. Each screw has a swivel connection with a curved shoe 13 to the concave face of which is connected a lining 14. The shoes are held from rotation and as the screws are rotated the shoes will be moved bodily toward or from the center of the wheel.

A dog 15 is pivotally supported by the flange 9 and located with respect to a screw 11 that it may enter the groove 12 in the screw which will hold the screw from unturning. A spring 16 holds the dog in engagement with the screw. This arrangement of dog and spring is provided for each of the screws 11. In this instance, to each of three of the spokes 2 of the supplemental wheel is connected a clamping device by which the supplemental wheel is connected to a wheel of a motor car, and comprises a yoke 17 provided with a lining 18, the yoke connected to the spoke by the link 19 having its hooked end 20 entering an opening in the spoke. This yoke has a transverse opening 21, Fig. 4, through which a screw-threaded bolt 22 passes, and receives a crank 23 with a screw-threaded head. The outer end of this bolt 22 is in the form of a hook 24 which is provided with a lining 25. The cranks of the three yokes are connected to a ring 26 each by a spring 27.

In placing the supplemental wheel in connection with a disabled wheel of a motor car, the disabled wheel is jacked up sufficiently to clear the ground some distance. The shoes are withdrawn sufficiently to permit them passing over the hub 28 of the disabled wheel 29 when the end of the hub of the disabled wheel will be located within the lining 7 of the annular flange 6. The hooked ends 24 of the bolts 22 are placed around the spokes 30 of the disabled wheel and are drawn up by turning the cranks 23 when their free ends are connected to the ring 26 by the springs 27. The screws 11 are then turned inward which will firmly seat the linings of the shoes against the hub of the disabled wheel, the springs 16 of the dogs 15 will permit the screws to turn. The jack is then removed which will lower the supplemental wheel to the ground, and the tire of the disabled wheel will be held free of the ground. The reverse of these operations will remove the supplemental wheel after the disabled wheel has been jacked up.

The wheel is useful when the wheel of the motor vehicle becomes disabled from puncture or otherwise, and will enable the occupant to reach home or a garage when the disabled wheel can be repaired.

The links 19 serve to hold the yokes in connection with the spokes of the supplemental wheel against the action of the springs 27.

I claim as my invention.

1. A supplemental wheel comprising a central hub and rim, a plurality of shoes bodily adjustable toward and from the center of the hub, a screw connected to each shoe by which the shoe is supported, and means for holding them in their adjusted position.

2. A supplemental wheel comprising a central hub and rim, a plurality of shoes, each having a lining, a screw connected to each shoe by which the shoe is supported and means for preventing the screw from withdrawing.

3. A supplemental wheel comprising a central hub and rim, a plurality of shoes, each having a lining, a screw connected to each shoe, and a dog engaging the screw and preventing it from withdrawing.

4. A supplemental wheel comprising a central hub, rim, and connecting spokes, a yoke detachably connected to a spoke, a screw-threaded bolt supported by the yoke and having a hooked end, and a nut held in connection with the bolt.

5. A supplemental wheel comprising a central hub, rim and connecting spokes, a yoke detachably connected to a spoke, a screw-threaded bolt supported by the yoke and having a hooked end, and a crank with a screw-threaded end held in connection with the bolt.

6. A supplemental wheel comprising a central hub, rim and connecting spokes, a yoke, a link connecting the yoke with the spoke, a screw-threaded bolt supported by the yoke and having a hooked end, and a nut held in connection with the bolt.

In testimony whereof I have hereunto set my hand in presence of two subscribing witnesses.

MILTON D. STOCKING.

Witnesses:
 A. O. BEHEL,
 E. D. E. N. BEHEL.